Jan. 2, 1951 W. A. ANDERSON 2,536,525
FRONT-FEED MECHANISM
Original Filed June 27, 1946 8 Sheets-Sheet 1
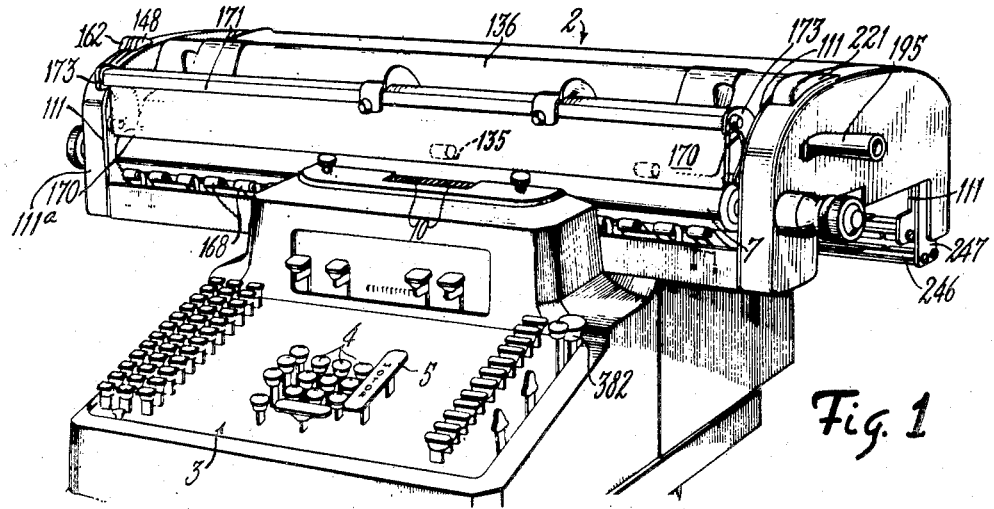
Fig. 1
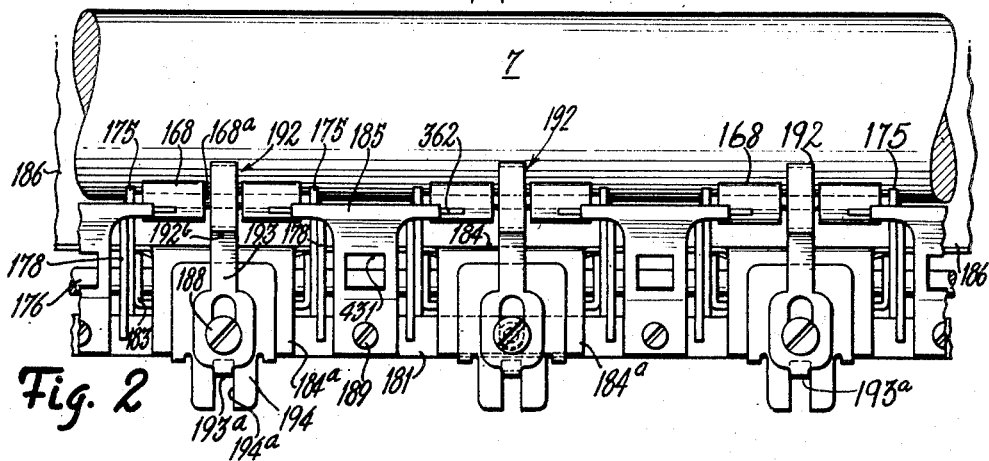
Fig. 2
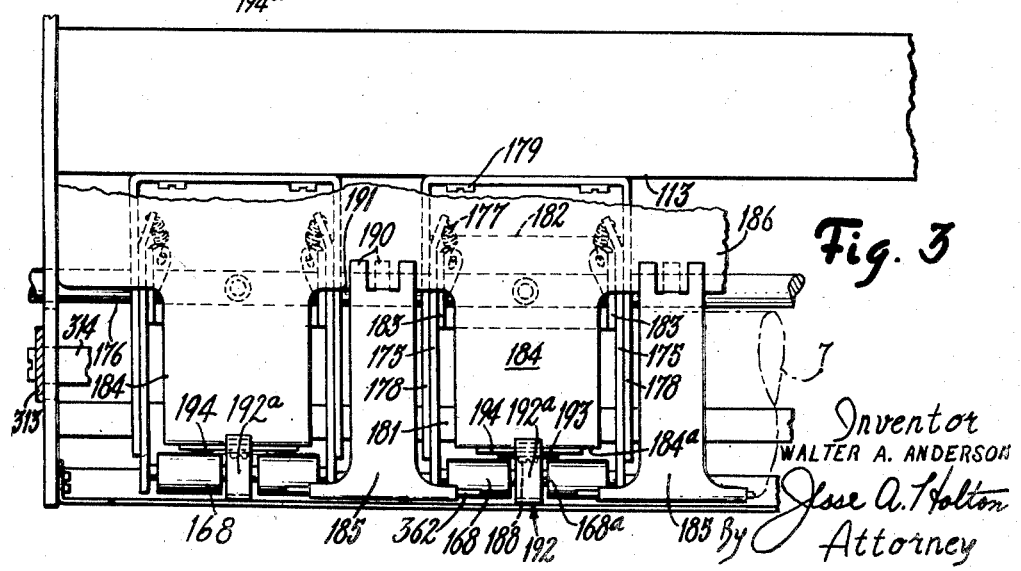
Fig. 3
Inventor
WALTER A. ANDERSON
Attorney

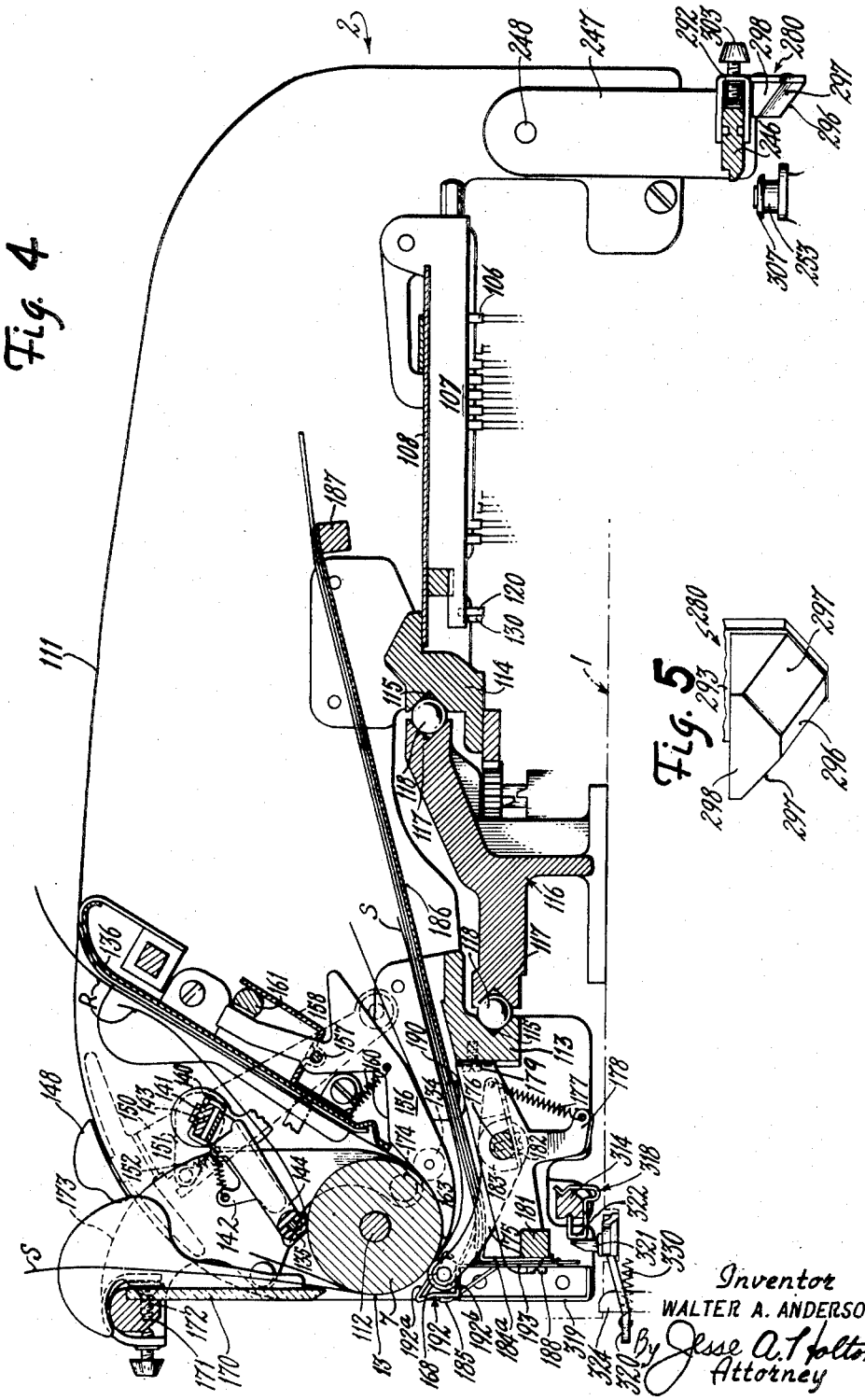

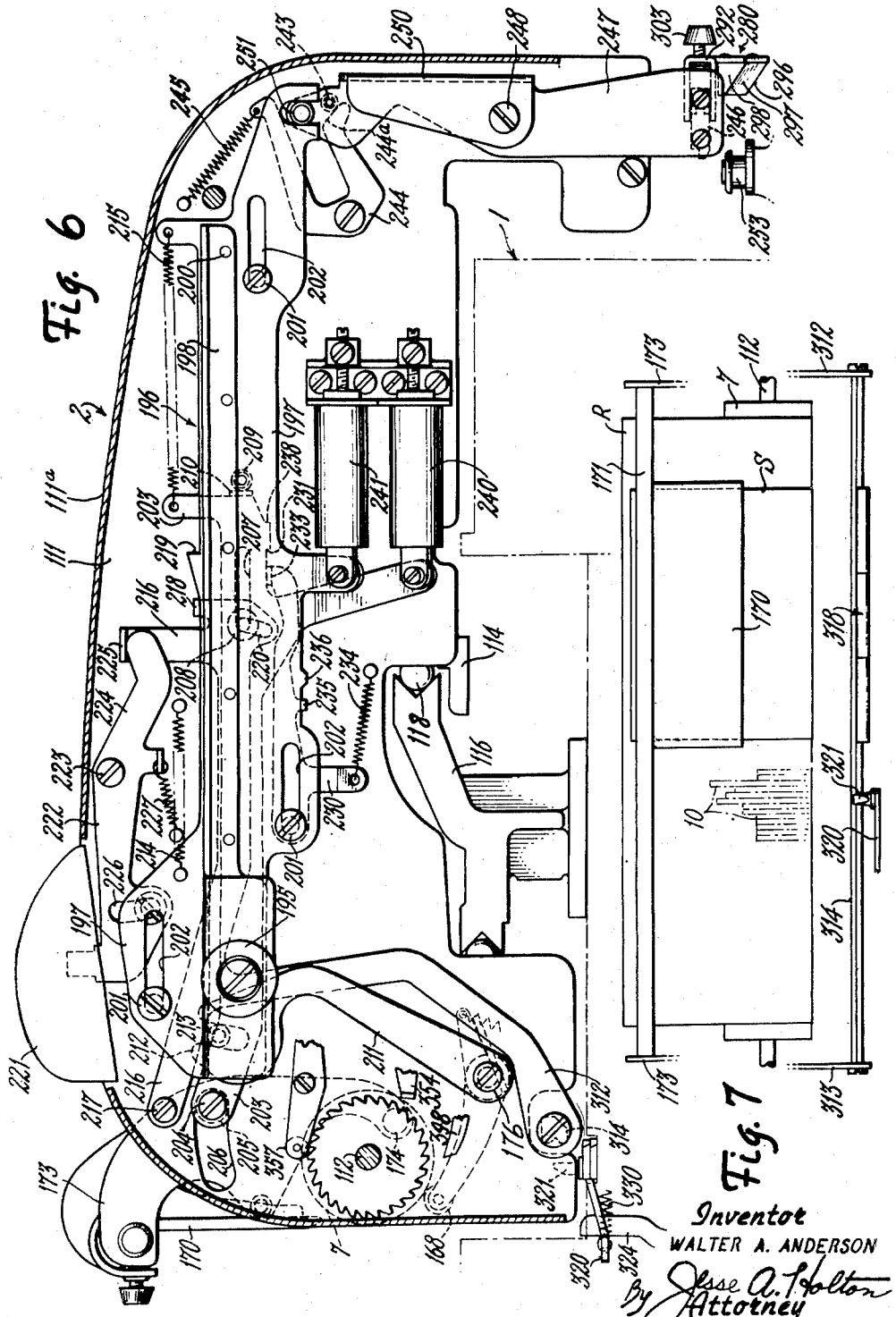

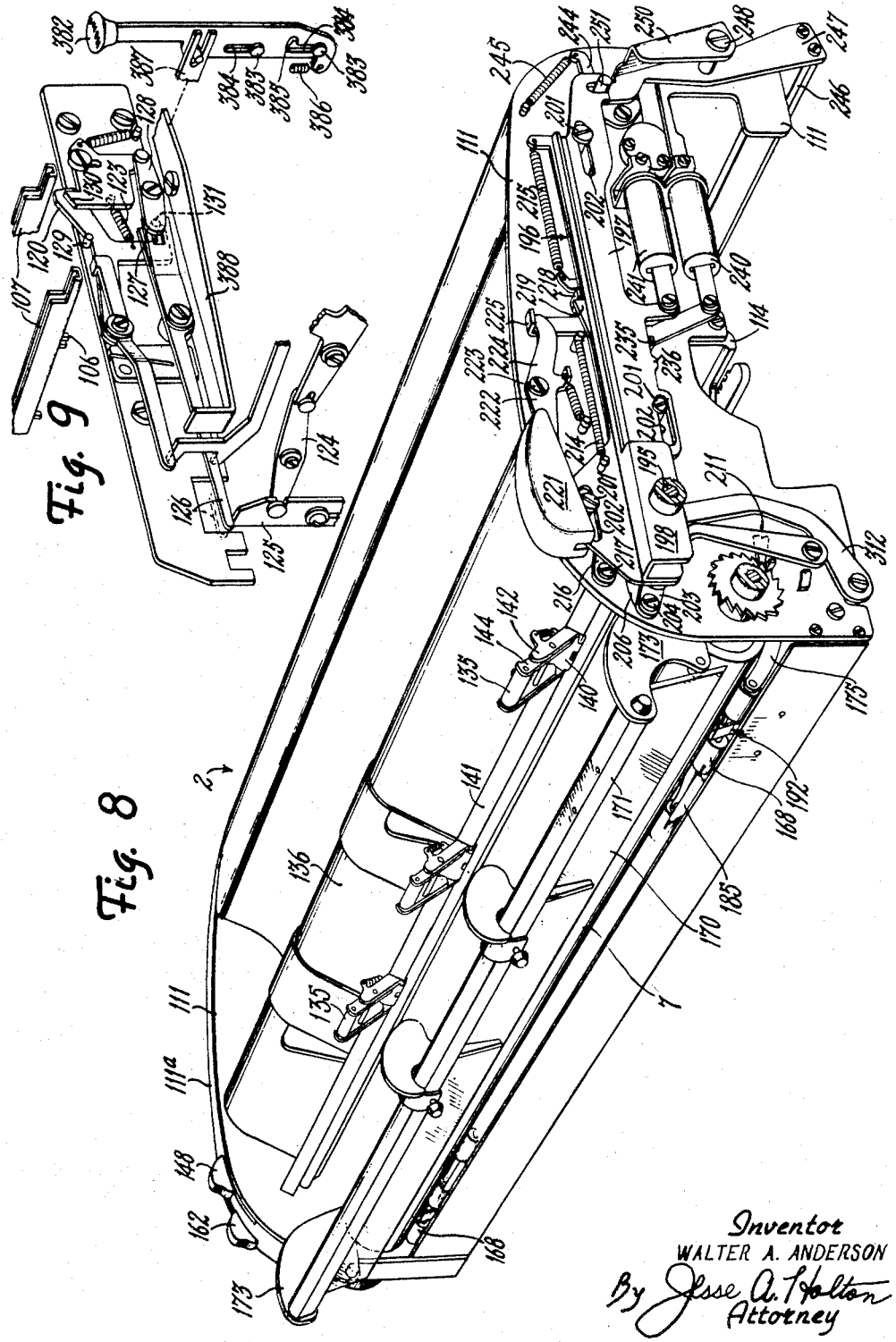

Jan. 2, 1951   W. A. ANDERSON   2,536,525
FRONT-FEED MECHANISM
Original Filed June 27, 1946   8 Sheets-Sheet 5
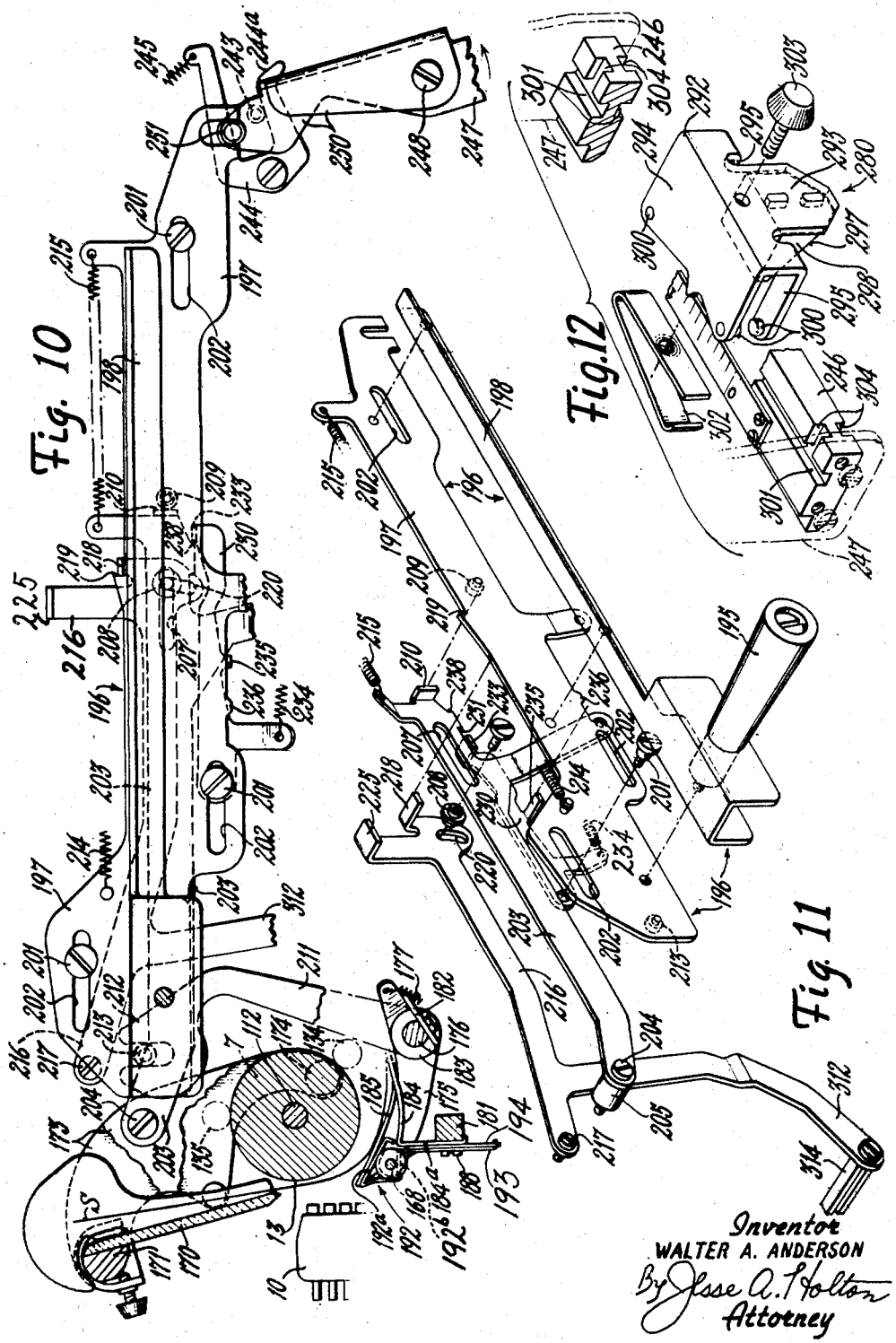
Inventor
WALTER A. ANDERSON
By Jesse A. Holton
Attorney

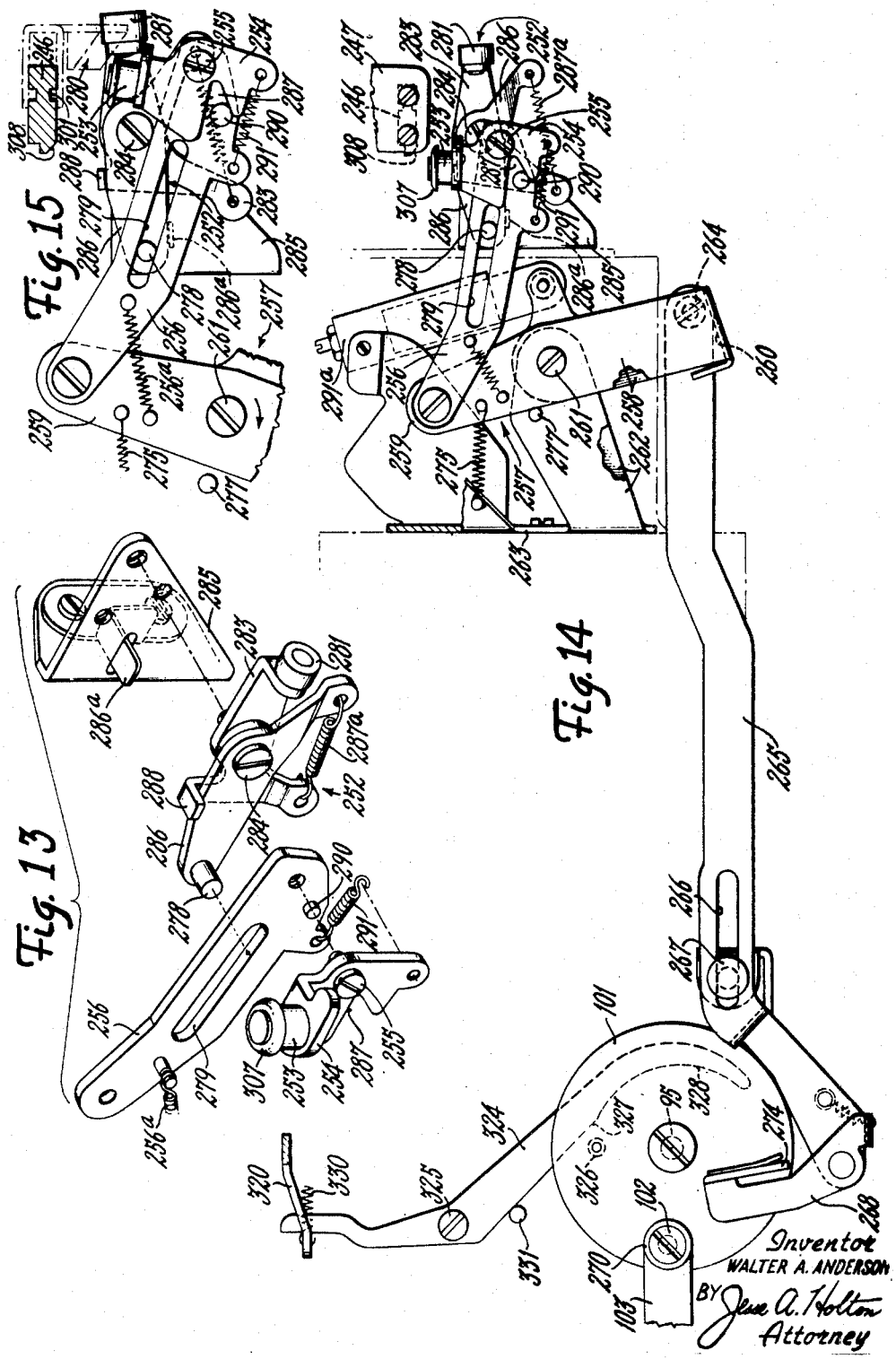

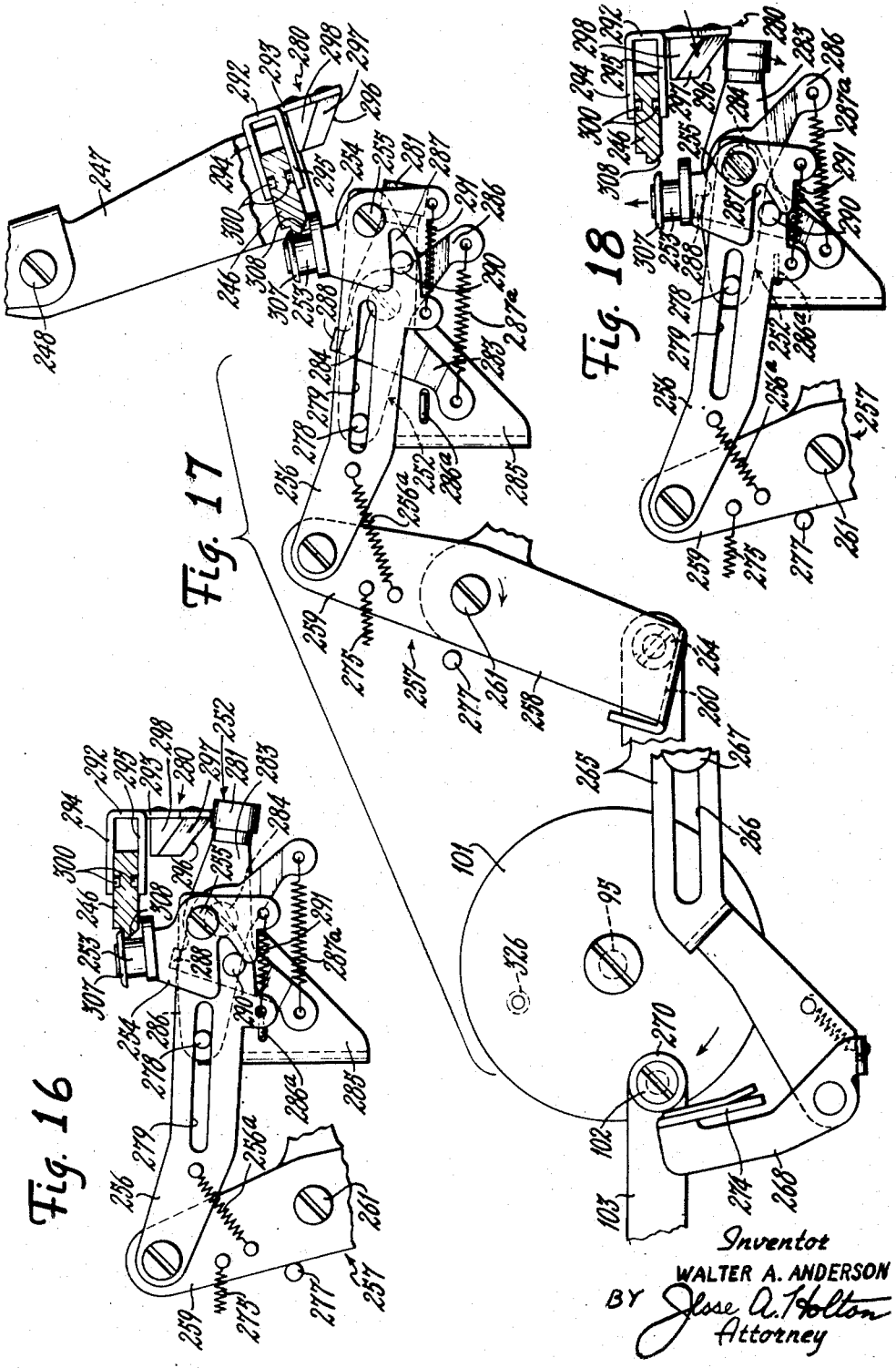

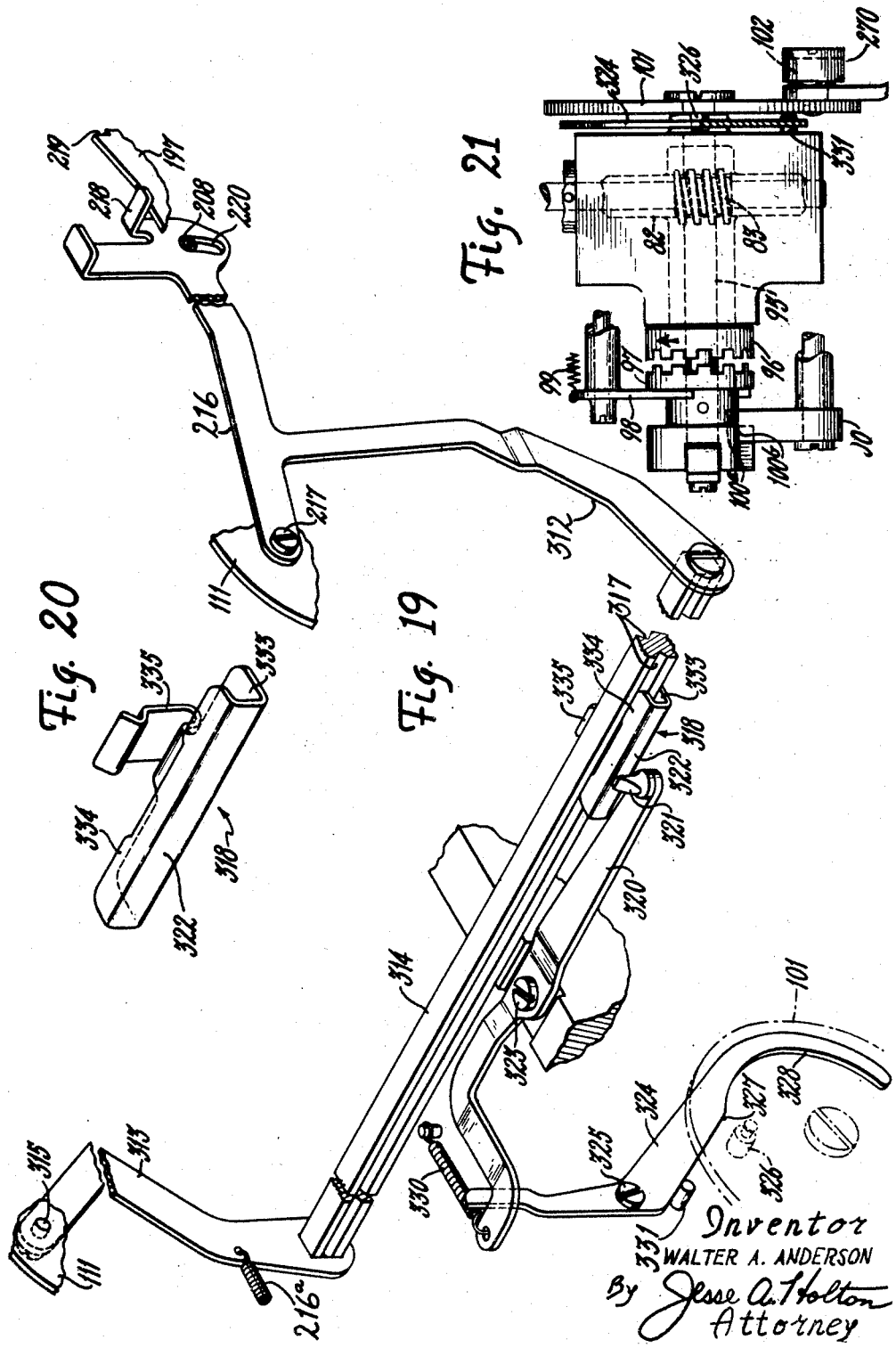

Patented Jan. 2, 1951

2,536,525

UNITED STATES PATENT OFFICE 2,536,525

FRONT-FEED MECHANISM

Walter A. Anderson, Bridgeport, Conn., assignor to Underwood Corporation, New York, N. Y., a corporation of Delaware Original application June 27, 1946, Serial No. 679,722. Divided and this application December 28, 1946, Serial No. 718,913

56 Claims. (Cl. 197—128)

1

This invention is a division of application Serial No. 679,722, filed June 27, 1946 and relates to business machines in general, particularly, to improvements in work-sheet supporting and front-feeding facilities disclosed in said application, said application claiming subject matter pertaining to partial opening of a front-feed device.

It is an object of the present invention to provide improved and efficient facilities for front-feeding work-sheets to business machines, and particularly also in efficient cooperation with devices for rear-feeding work-sheets.

It is another object of the instant invention to provide an efficient front-feed mechanism embodying a non-elevatable platen, and yet facilitating front-feeding of work-sheets with extreme dispatch for ease.

It is furthermore an object of the invention to produce front and/or rear-feeding facilities which are suited for advantageous handling and production of records that satisfy numerous different business requirements or systems.

A further object of the invention is to contrive means for efficiently power-conditioning a front-feed device for reception of one or more work-sheets.

Especially, it is also an object to accomplish the purposes of a last-named object through a frame-supported power source, in any desired position of a paper-supporting carriage and under positional control of the latter in a manner that makes for economy, flexibility of application and efficiency all around.

Another feature of the invention is to devise reliably operative means whereby to effect closure of the front-feed facilities and clamping of front-fed work-sheets with efficiency under supplemental control of the paper-supporting carriage and an operable part, the latter of which may be in the form of a machine cycling or other key.

An object ancillary to the several preceding ones is to provide for flexibility of the control wielded by the carriage, thereby to expand greatly the versatility of the machine for use in different business applications.

Also to the end of greater versatility of the machine it is an object of the invention to provide for efficient opening and closing operation of the front-feeding mechanism under fully independent carriage control for both these operations.

An important object is also to furnish efficient means for rendering an openable front-feeding device unobstructive to typing instrumentalities in response to the institution of all such machine cycles at the outset of which the front-feeding device may have been in obstructing position.

It is also contrived to provide simple means to render a front-feed table incapable of being drawn forwardly into conflicting relations with the typing instrumentalities by application of manual force, directly on said table.

In addition to the above specifically noted objects, the invention has many other objects in view which are in part obvious and in part pointed out specifically as the description of the preferred embodiment of the invention proceeds.

The invention has been worked out and is illustrated and described as embodied in the well-known Class D Sundstrand accounting machine, the main conventional features of which are disclosed in the U. S. patents to Sundstrand, Nos. 2,194,270 and 2,209,240 dated respectively, March 19, 1940, and July 23, 1940. Reference to this machine and these patents may be had for clarification of features which are not directly part of the present invention.

In the accompanying drawings:

Figure 1 is a perspective view of a Sundstrand accounting machine embodying the front-feeding device in normal position.

Figure 2 shows in front elevation certain structural details of a paper-feeding and guiding mechanism constituting part of the front feed device.

Figure 3 shows the mechanism of Figure 2 in top elevation.

Figure 4 is a right-hand sectional side view of the new paper supporting carriage, the new front-feeding device being shown in the normal position as in Figure 1.

Figure 5 pictures a control cam proper, for fully opening the front-feed device, the cam being viewed from the right front side thereof.

Figure 6 is a right-hand side elevation of the new front-feed carriage with all parts in normal position.

Figure 7 depicts in frontal aspect, diagrammatically, a short front-feed table in association with an automatic front-feed closure-controlling feature set up to cause closure thereof whenever the machine is cycled with the types positioned in front of the short table.

Figure 8 is a front perspective view of the new carriage with the right side turned to view, showing the front-feeding device in front-feed condition, and showing top feed-rolls for a record sheet cast off the platen.

Figure 9 is a fragmentary perspective view of a conventional tabulating control mechanism for the carriage, including also an incapacitating or normalizer key control therefor.

Figure 10 is a fragmentary, right-hand side elevation showing the front-feed device moved to and latched in front-feed position.

Figure 11 shows a number of controlling and operating parts of the front-feeding device, which are carried on the right carriage end, disassembled and spread apart.

Figure 12 is a fragmentary rear perspective view, depicting a carriage control for causing opening of the front-feed device, on a supporting bar.

Figure 13 is a rear perspective of certain parts of an automatic power opening mechanism for the front-feed device, in disassembled relation.

Figure 14 shows in side elevation a portion of a machine cycling mechanism, and portions of devices power operable thereby, for opening and closing the front-feed device, the parts being shown in normal inactive position.

Figure 15 illustrates a portion of the power operating device of Figure 14 in an idly operated state.

Figure 16 shows a portion of the actuating mechanism for opening the throat, the mechanism having been conditioned under carriage control for effective operation at the next machine cycle.

Figure 17 is a side view similar to Figure 16, but illustrates the actuating mechanism for opening the throat as having been power-moved effectively to operated position.

Figure 18 pictures the actuating mechanism for opening the front-feed device, in the process of being reconditioned for another effective operation incidental to the next cycling operation.

Figure 19 is a front perspective view, looking down at an angle from the right of the machine, and showing a controlling mechanism providing for restoration of the front-feed device to closed position under carriage control by the machine cycling mechanism.

Figure 20 is an enlarged detail view of a control clip shown also in Figure 19.

Finally, Figure 21 is a plan view illustrating certain parts of the invention in association with the machine cycling mechanism.

For convenience of reference and study of the invention, the description is divided into the following headings:

1. Old Sundstrand accounting machine features
2. Paper supporting carriage and tabulating control therefor
3. Record and statement sheet feeding—general
4. Record sheet holding and feeding devices
5. Front-feed table and throat
6. Manual front-feed conditioning
7. Manual restoration of front-feed device
8. Locking and timing devices for front-feed device
9. Automatic front-feed conditioning
10. Automatic restoration of front-feed device
11. Normalizer key, and heading balances
12. Miscellaneous and conclusion 1. *Old Sundstrand accounting machine features*

Referring now more particularly to Figure 1, the machine comprises a stationary machine section generally designated by the numeral 1, and a paper supporting carriage 2 movable transversely on said stationary section. A keyboard 3 embodied in the stationary section includes the usual amount indexing keys 4, a cycling key or bar 5, and many other controls, the function and purposes of which are well known. The carriage 2 is provided with the customary platen roller 7 which serves to support work-sheets for receiving impressions from amount-printing and other types 8 carried on a series of laterally adjacent type-bars 10. The said type-bars 10 are supported in the stationary section 1 of the machine in a conventional manner, for differential vertical sliding movements from retired positions below a typing line indicated by the reference numeral 13, see Figure 4. The differential sliding movements place the said type-bars 10 in various raised positions, presenting desired types in front of said typing line 13 and for printing actuation rearwardly against the platen by conventional hammers, not shown. Registers of usual design, not shown, are associated with the type-bars 10 for operation thereby. The extent of rise of the type-bars is predeterminable by fingering the amount keys 4, and the cycling mechanism of the machine provides for the rise and restoration of the type bars 10 respectively during a first and second half cycle, the cycles, after fingering the amount keys 4, being usually instituted by depression of the cycle key 5. At times the type-bars are caused to rise to appropriate positions representing a total in a register. Such operations are instituted either under control of the carriage or a total key.

The machine is cycled under the power of a motor, not shown, which by means of a worm 83, see Figure 21, drives a worm wheel 82 continuously at reduced speed. The worm wheel 82 is rotatively mounted on a shaft 95 and is integral with a toothed clutch element 96. Slidably splined on the shaft 95 for engagement with the clutch element 96 is a companion clutch element 97. A clutch shifter 98 under constant tension of a spring 99 tends to move the clutch element 97 into engagement with the other clutch element 96. However, as seen in Figure 21, the clutch element 97 is normally held out of engagement with the clutch element 96 by a cycle trip dog 100, having a cam-face 100ᵃ to cam the clutch element 97 to open-clutch position, and having also a shoulder 100ᵇ to hold this clutch element 97 against rotation. Said dog 100 is moved or tripped free of the clutch element 97 in response to each depression of the cycle key 5 and also some other keys, through conventional means shown in said U. S. Sundstrand Patent 2,194,270, and moves again into position before the shaft 95 has received a complete revolution, thus to restrict turning of the shaft 95 to one single revolution for each cycle trip. The shaft carries rigidly thereon a disk 101 which has a crank pin 102 to reciprocate a pitman 103, which through means well known controls the type-bars 10 to rise and descend respectively during the first and the second half revolution of the disk 101. The cycle trip dog 100 is also operable under control of the carriage, as shown in Figure 4, by tappets 106 that are on usual function control dogs 107 which are adjustably carried on a supporting plate 108, on the carriage, and which mechanism with related parts is fully described in said Patent No. 2,194,270.

2. Paper supporting carriage and tabulating control therefor

The paper supporting carriage 2, see Figures 1, 4, 6 and 8, comprises two spaced side walls 111 between which the platen 7 is accommodated, the platen being fast on a platen shaft 112 which is rotatably supported in the opposite side walls 111 for paper feeding control. The side walls 111 of the carriage are rigidly interconnected by rail bars 113 and 114 which lie very low and have carriage guideways 115 facing towards each other. Between the ways of said rail bars 113, 114 there is a track structure 116 surmounting the frame 1 of the machine, said track structure affording opposite track-ways 117 contiguous to the guideways 115 and anti-friction elements 118 being interposed between the guide-ways 115 and the track-ways 117. A spring motor, not shown, constantly tends to advance the carriage leftwardly. Side covers 111ª conceal mechanism supported on the carriage walls 111.

Referring now to Figures 4 and 9, a vertically swingable escapement element 120, in cooperation with the front end of differently positioned function control dogs 107 on the carriage, normally holds the carriage in one of a number of different tabulating or columnar positions. Whenever the carriage is at rest, the front end of one of the control dogs 107 is abutting against the right end of the escapement element 120, the latter of which normally is resiliently held raised against a stop 129, by a spring 123. Ordinarily when the machine cycles, it is desired that the carriage thereafter execute a tabulating movement from one column to the next. To this end a lever 124 is reversely actuated respectively at the beginning and the end of each cycle to vibrate a slide 125 vertically and to actuate and return a lever 126. The lever occupies normally the position as seen in Figure 9, but when actuated, a bifurcated end 127 thereof acts upon a pin 131 of another lever 128 to temporarily project a holding dog 130 into the path of the active columnar control element 107. Concomitantly with the projection of the holding dog 130, the swingable element 120 is withdrawn below the active function control dog 107, permitting the carriage to advance slightly until arrested by the projected holding dog 130, the element 120 being then under the dog 107. Said element 120 receives its downward movement at the actuation of the lever 126 through the medium of the pin 131 on the lever 128. Upon return of the lever 126 to normal position, namely at the end of each machine cycle, the said dog 130 is withdrawn so that the carriage can then tabulate. Resultingly also, the element 120 restores to normal position and will intercept the carriage in the next columnar position as defined by the next control dog 107 to the right of the one which has just escaped. For full particulars of this tabulating mechanism see said Patent No. 2,194,270. At appropriate times, by means not shown, the carriage is power-returned to come to rest at a desired columnar position, ready to execute renewed tabulating steps.

3. Record and statement sheet feeding—general

Accounting machines are required to hold a minimum of one journal or record sheet, and a minimum of one ledger or statement sheet. In the drawings said record sheets are designated by the reference character R, and the statement sheets by the reference character S. The record sheets are rear-fed and receive a carbon-record of entries made upon successively front-fed statement sheets, the latter of which are desired to be front-fed because they require very frequent handling.

4. Record sheet holding and feeding devices

Feed-rolls 134, see Figure 4, bear normally upon the rear-side of the platen 7, below the level of the platen shaft 112, and other feed-rolls 135 bear normally upon the top-side of the platen, all to hold a record sheet R in typing position on the platen. Above the feed-rolls 134, extending between the carriage ends 111, and inclined rearwardly, there is a sheet supporting table 136 rigidly fastened to the carriage ends 111. The record sheets R may be rear-fed to the platen, downwardly in front of said table 136, and are rolled between said feed-rolls 134 and the platen, forwardly and upwardly underneath the top feed-rolls 135.

The top feed-rolls 135 are supported on sliding members 140 that are adjustably movable along an inverted T-shaped bar 141 and have laterally spaced arms 142. The bar 141 extends the full length between the carriage ends 111 and has round ends 143 by means of which it is pivotally carried on the carriage ends. Each sliding member carries one feed roll 135 by means of resiliently mounted lever extensions 144 carried on said spaced arms 142. The feed-rolls 135 are movable to and from the platen under control of a finger piece 148 on a lever 150 having a pin-and-slot connection with an arm 151 fast on the left end of the bar 141. A strong spring 152, attached to the arm 151, serves to press the feed-rolls 135 in feeding contact upon the platen. The finger piece 148 in being moved rearwardly causes the spring 152 to swing over center and swing and hold the feed rolls 135 away from the platen, as shown in Figure 8.

The bottom feed-rolls 134, of which there are a series alongside of each other extending along the platen, are each rotatively supported by a pair of levers 156, upon a common pivot rod 157, the latter of which is carried on a generally Z shaped supporting web 158 on the carriage. Springs 160 urge the feed-rolls 134 towards the platen. A flat-faced cam shaft 161, when turned, acts upon upreaching arms of the levers 156, to displace them forwardly and cast off the feed-rolls 134 a small distance away from the platen. Said shaft 161 is rotatable to throw off the feed-rolls 134 by a rearward displacement of a finger piece 162, similar to the finger piece 148, see Figures 1 and 8, by means not shown. The feed-roll supporting-levers 156 have tapered tongues 163 reaching forwardly of the feed-rolls 134, to guide rear-fed sheets such as record sheets R, in a curved path towards the front of the machine. The rear-fed sheets as they emerge at the front of the platen are directed rearwardly under the top feed-rolls 135.

5. Front-feed table and throat

The invention provides for efficient and convenient front-feeding of work-sheets, such as said statement sheets S, down the front-side of the platen and thereunder to the rear. Figure 4 shows a statement sheet S in position for typing thereon, paper holding means, in the form of feed-rolls 168, being shown bearing against the front-bottom side of the platen 7 to hold such sheet. Above the typing line 13, a front-feed guide or table 170, preferably of transparent material, bears rearwardly against the statement sheet S, thereby causing the latter to be wrapped in close contact around the front-side of the platen at the typing line 13, suitable for receiving impressions from the types on the bars 10. With the front-feed table 170 in the position described, the type-bars 10 can rise freely to their printing positions. Usually after one line-entry on a statement sheet, such sheet is removed and another is presented, the record sheet R remaining in the machine and being required to be line spaced. As illustrated in Figure 10, in order to facilitate removal of one statement sheet S, and the introduction of another in its place, the paper holding means or feed-rolls 168 are cast off the platen and the front-feed table 170 is displaced forwardly to occupy a forwardly tilted position.

The transparent front-feed table 170 may in most cases be co-extensive in length with the platen, and, as seen in Figure 4, is secured along its upper margin by screws 172 to a stiff bar 171 of substantially square cross-section. The bar 171 is carried on opposite ends of the carriage by plates 173 which are pivoted to the adjacent side walls 111 of the carriage by means of pivot studs 174. The latter are located to render the front-feed table 170 displaceable about an axis that lies parallel to the platen, to the rear thereof, and below the platen axis. This provides that during the restoration of the table 170 its lower edge will glide upwardly over the front-fed paper to wrap it in tight contact with the platen.

Said feed-rolls 168 extend in a row along the platen, see Figure 2, and each is rotatively supported at the opposite ends thereof by arms 175 carried swingably upon a supporting shaft 176. Brackets 178, see Figures 3 and 4, flank each pair of the arms 175 and are fastened behind the shaft 176 to the rail bar 113 of the carriage as at 179. Forward of the shaft 176 said brackets are fastened to a carriage-frame-bar 181 which spans the space between the carriage end-walls 111. Said brackets 178 have the shaft 176 extend therethrough to afford bearing supports for the latter. Springs 177 attached to rearward extensions of the arms 175, and anchored to the adjacent brackets 178 urge said arms 175, and thus the feed-rolls, constantly towards the platen. The shaft 176 is non-circular in cross-section and carries intermediate each pair of feed-roll carrying arms 175 an element 182. Each of these elements 182 has opposite, apertured ears 183 to fit the shaft and to turn therewith, the spaced ears in conjunction with the brackets 178 serving to locate the feed-roll arms 175 properly spaced along the shaft 176. Said elements 182 reach under the aforesaid feed-roll arm extensions, from which they are normally slightly spaced to allow good feeding contact of the rolls 168. For release of the feed-rolls 168, the shaft 176 is given an anti-clockwise movement as viewed in Figure 10, so that the elements 182 thereon will engage and move the feed-roll arms to cast off the rolls 168.

The sheets S which are front-fed down between the platen and feed-rolls 168, see Figure 10, take a wide sweep around the underside of the platen, rearwardly well below the tapered tongues 163, see Figure 4, of the rear feed-rolls 134. Such wide sweep is given the sheets by guiding elements 185 situated between the feed-rolls 168, and below which the latter withdraw when released. The said guiding elements 185 are augmented in their function by a paper shelf 186, see Figure 4, which has only a slight upward tilt to the rear and which extends the full distance between the opposite carriage ends 111. The wide sweep of sheet introduction which the shown and described structure provides, facilitates introduction of all commonly used weights of paper with extreme ease and without detrimental buckling tendency; yet the bend given the work-sheets produces just enough friction to cause them to remain in position upon introduction. Said paper shelf is fastened at the rear to a square bar 187 fast on the carriage, and ends at the front in spaced sections 184 having vertically bent tabs 184a for securement to the square bar 181 by shouldered screws 188, see Figures 2 and 4. The said guiding elements 185 are situated between the gaps 191 formed between the sections 184 and are laterally intermediate the feed-rolls 168. They, as seen in Figure 3, are formed at the rear with upwardly and downwardly offset tines 190 to clip onto the paper shelf 186, and at the front they have each a sharp angular bend, downwardly and rearwardly for securement to the front of the bar 181 by screws 189, see Figure 2.

The feed-rolls 168, when released to Figure 10 position, are slightly below the guiding elements 185. In some cases, because the work-sheets S in being front-fed have a tendency to flex downwardly between said guiding elements 185, they tend to get caught or fouled on the front sections 184 of the paper shelf 186, or on the feed-rolls 168. Especially work-sheets of light weight, and such that are notched or punched along the introductory edge, have the above tendencies. Provision is therefore made to assure, in all cases, smooth, substantially resistless guidance of front-fed work-sheets S rearwardly underneath the platen and onto the paper shelf 186. Drawing attention especially to Figures 2 and 3, to this end there is accommodated at a circumferentially reduced, intermediate section 168a of each feed-roll 168, a deflector element 192, each such element having a narrow sheet-deflecting shelf 192a nested closely to the platen when said feed-rolls 168 are in applied position, but moving an appreciable distance from the platen when the feed-rolls are cast off, that is when the carriage is conditioned for front-feeding work-sheets as seen in Figure 10. The deflector shelves 192a move downwardly a lesser distance than the feed-rolls 168, and will come to lie slightly above these feed-rolls, and will thus guide the paper with some clearance over the rolls. The deflector elements 192 comprise each a main vertical leaf 193 which at the top has a four-sided cage bent therefrom, in which is accommodated the reduced feed-roll section 168a. A top side of said cage consists of said deflector shelf 192a, and another side 192b underlies directly the reduced feed-roll section 168a. Each of the deflector elements 192 has a vertical slot in the vertical portion 193 thereof, and the screws 188 which fasten the front-end of the paper-shelf to the bar 181, are shouldered to provide guides and mount the various deflector elements 192 for vertical sliding movement. To keep said elements 192 in straight position, they have each at the bottom-end thereof, see Figure 2, a lug 193a piloted in a vertical slot 194a provided in a plate 194 overlying one of the bent-down tabs 184a of the paper-shelf 186, said plates 194 and tabs 184a being firmly clamped to the bar 181 by the shoulders of said screws 188. Preferably the vertical leaf 193 is slightly bowed to enable the screw 188 to keep the element 192 frictionally in the position to which it is moved. In operation, when the feed-rolls 168 are being applied, the reduced sections 168a thereof contact the shelf 192a within said cage to lift the deflectors upwardly to the position seen in Figure 4. During the release of said feed-rolls 168, the deflector elements 192 will be imparted a downward movement by engagement of the reduced feed-roll sections with the lower wall 192b of said cage, the final relative positions of the parts being as illustrated in Figure 10, affording smooth guidance to front-fed sheets clear over the rolls 168.

6. *Manual front-feed conditioning*

The front-feed table 170 and the feed-rolls 168 are movable to front-feed position by an operating handle 195, see Figures 1 and 6, carried upon a composite slide structure generally designated by the numeral 196, and consisting of a flat slide 197 and a stiffening angle member 198 riveted to the former as indicated in Figure 6 at 200. The composite slide 196 is carried upon the right side wall 111 of the carriage by means of three headed screw-studs 201 extending through slots 202 in the slide 197. Accommodated between the slide 197 and the carriage side wall 111 is a link member 203 which at its forward end has a pivotal connection, as at 204, with a stud 205 projecting from and rigid with the right end-plate 173 of the front-feed table 170, said stud 205 reaching through a clearance aperture 206 in the right carriage end 111, see Figure 6, and in conjunction with said aperture affording limits for opposite movement of the front-feed table and the operating slide. Near the rear end, the link 203 is slotted as at 207 for guidance upon a shouldered stud 208 having a retainer head. In the rearward position of the front-feed table, see Figure 6, a laterally bent-off rear-end 210 of the link 203 is directly in front of an operating pin 209 projecting from the slide 197. Therefore when the operating handle 195 is imparted a forward movement, said link 203 will be displaced forwardly by the pin 209 to swing the front-feed table 170 to front-feed position seen in Figure 10. In order to release the feed-rolls 168 from the platen at the same time that the front-feed table 170 is displaced forwardly, the aforesaid feed-roll releasing shaft 176 extends and has affixed thereto, outside of the right carriage end, as seen in Figure 6, an upright arm 211 having a forked end 212 embracing a pin 213 on the slide 197. The composite slide 196 is resiliently retained in its rearward position by means of a spring 214 anchored to the adjacent carriage wall 111. In turn the link 203, and therefore also the connected front-feed table 170 are resiliently urged rearwardly by a spring 215. To retain the front-feed facilities in front-feed condition after movement thereto, there is provided a latch arm 216, pivotally supported upon the carriage as at 217, and having a bent lug 218 thereon to catch behind a shoulder 219 on the slide 197 as such slide approaches its forward limit position. The aforesaid stud 208, aside from giving guiding support to the link 203, gives also guiding support to the rear-end of the latch arm 216, the latter being provided with a guiding slot 220 cooperative with said stud 208.

Forward movement of the slide 196 has the effect of immediately beginning the cast-off of the feed-rolls 168, wherefore front-fed work sheets S are free for removal at the earliest possible moment.

7. *Manual restoration of front-feed device*

The front-feed device is restorable to normal condition under control of a carriage supported key 221 constituting a part of a lever 222 pivoted as at 223 to the adjacent carriage wall 111, and having a rearwardly extending arm 224 underlying a lateral tab 225 on the latch arm 216, see Figure 6. Said lever 222 is given guiding support and is limited in its motion by means of a pin and slot connection 226 with the adjacent carriage end. A spring 227 resiliently maintains the key 221 in the normal, Figure 6, position. It will be seen that depression of key 221 will cause the restoration of the front-feed device to normal condition by effecting an upward displacement of the latch 216, whereby the slide 196 is given over to the power of the spring 214.

8. *Locking and timing devices for front-feed device*

Provision is made whereby the front-feed table cannot be moved into conflicting range with the type-bars 10, by manual force applied directly to the table. This is to prevent injury to said type-bars and/or the table 170. To the above ends, see Figure 6, the operating link 203 for the front-feed table 170 has a shoulder 231 which is normally blocked by an ear 233 on the rear-end of a blocking arm 230. The latter is pivotally mounted on one of the studs 201 which guides the composite slide 196. The shoulder 231 is normally slightly to the rear of the ear 233, as in Figure 6, to allow some forward displacement of the front-feed table, but not into the operating range of the type-bars 10. A spring 234 normally holds the blocking arm in potentially effective position with the ear 233 engaging the underside of the link 203. If, however, the slide 196 is moved forwardly by the handle 195, or by power in a manner yet to be described, said blocking arm 230 is cammed out of the way of the shoulder 231. To this end a lug 235 on the blocking arm 230 is engageable by a protuberance or swell 236 on the slide 197 during the initial forward movement of the latter, to displace the blocking ear 233 clear of the moving path of the shoulder 231.

In restoring the front-feeding device to normal condition under control of said key 221, or automatically in a manner yet to be described, it is desired that the feed-rolls 168 be applied in advance of the rearward restoring movement of the front-feed table. This is to assure clamping of the front-fed work-sheet or sheets S in the positions in which they are presented by the operator down the rear-side of the front-feed table, and particularly to prevent the front-feed table 170 from disturbing the paper while the lower edge thereof glides rearwardly and upwardly over the paper. For this purpose, the blocking ear 233 of the arm 230 snaps at the end of the forward displacement of the slide 197 behind a rear shoulder 238, the protuberance 236 on the slide 196 having by this time moved clear of the lug 235 to permit this. See Figure 10. It will now be seen that freeing of the slide 196 for rearward movement, as by depression of the key 221, will first result in a rearward movement of the slide 196 under the power of the restoring spring 214, while the operating link 203 connected to the table 170 is temporarily detained by the blocking arm 230 at 238. As the slide 196 approaches its rearmost position, the protuberance 236 cams the blocking arm 230 free of the link shoulder 238 to allow it to be drawn rearwardly by the spring 215. The restoring movement of the frontfeed table thereupon is further delayed and impeded by the provision of an air dashpot 240, not only to assure that the front-feed table 170 will move softly and noiselessly to normal position but also to assure that it will practically not move until after the work-sheet S has been firmly gripped between the platen and the feed-rolls 168. For soft and controlled action the slide 196 has a dash-pot 241 associated therewith, but this dash-pot allows faster movement than the dash-pot 240.

To assure always full restoration of the front-feed device, an arm 250 of a bail-structure at the rear of the machine not yet described, carries a roll 243 wherewith there is associated a pivoted element 244 having a short cam-face 244a for contact with the roll 243. Said element is under tension of a spring 245, and the face 244a is designed to act on the roll only as the slide 196 approaches its normal rear position seen in Figure 6.

9. *Automatic front-feed conditioning*

The front-feeding mechanism is also movable to front-feed condition under the control of the carriage through action of the machine cycling mechanism, as will be described presently. Referring more especially to Figures 4, 6, 13 to 18, the carriage 2 carries along the rear thereof a bail comprising a bar 246 of generally right angular cross section, being at its ends rigidly carried on the lower ends of two spaced arms 247, the latter having pivotal supports on the opposite carriage ends 111, as at 248. The arm 247 at the right end of the carriage is part of a lever including the aforedescribed arm 250. Said arm 250 is operatively associated with the rear end of the slide 196 by a pin-and-fork connection 251. The same bail is normally positioned as shown in Figures 4, 6 and 14, and automatic actuation thereof, for conditioning the front-feeding device, rearwardly, is effected through rearward actuation of a roller 253 by the machine cycling mechanism, subject however to carriage control of the roller 253 into cooperative range with the bar 246. Such carriage control of the roller is exercised by one or more cam elements 280 provided on the bail bar 246, through the medium of a coupling device generally designated by the reference numeral 252. Said coupling device includes a roller 281 carried on the rear end of a lever 283 which, as considered with regard to Figure 14, is adapted to be rocked clockwise by any cam element 280 passing or riding onto the roller 281. The lever 283 is pivoted on a stud 284 provided upon a bracket 285 attached to the framework of the machine. The same stud 284 gives also pivotal support to another lever 286 which by a spring 287a arranged intermediate both levers is resiliently urged to move unitarily with the lever 283 in clockwise direction, the lever 283 having an ear 288 whereagainst the other lever is resiliently urged by the spring 287a. From the front end of the lever 286, there projects laterally a guiding stud 278 for an actuating link 256, the latter having an elongate slot 279 for accommodating the stud. The aforesaid roller 253 is mounted in upright position upon an element 254 that is carried on a pivot pin 255 projecting laterally from the link 256. For a purpose to be brought out later, the element 254 is limited in its pivotal motion by a pin 290, and a spring 291 having anchorage oppositely on the link 256 and the element 254 keeps the latter normally turned clockwise into stopping contact with said pin. See Figure 14. The link 256 is at its front end linked to an upstanding arm 259 of a rocking structure 257. The normal position of the parts just described is as in Figure 14, in which the gravity of parts 253, 254, 281, 286, etc., assisted by a spring 256a locates the roller 253 below the bar 246 with the front end of the lever 286 resting on a stop 286a. The rocking structure 257 comprises additionally two laterally spaced arms 258 rigidly connected by a web 260, one arm 258 forming a downward continuation of the arm 259, and the other arm being located appreciably to the left. The entire rocking structure 257 is pivoted as at 261 upon two spaced bearing elements 262 of a frame supported bracket 263. The roller 253 and the parts leading thereto from the rocking structure 257 are disposed substantially at the middle of the machine, but operating means for the rocking structure is disposed to the left of the system of type-bars, substantially in the plane of the crank disk 101 of the cyling mechanism seen in Figure 21. Namely, the left arm of the rocking structure 257 has connected thereto, as at 264, a slide 265 provided near its front end with a slot 266 giving it sliding guidance upon the machine frame in conjunction with a frame-supported stud 267. The forward end of the slide 265 carries an upright extension 268 which reaches into the orbit of an actuating roller 270 on the crank pin 102 of the cycling mechanism. During a later part of each machine cycle, when the type-bars have nearly receded to normal position, the cycle actuated roller 270 wipes forwardly and upwardly against a padded flange 274 on the extension 268. In doing so, the slide 265 is given a forward displacement resulting in a rearward movement of the roller 253, with the effect that an operation of the bail bar 246 rearwardly by the roller 253 will result if the rear of the link 256, and therefore the roller 253, has preparatorily been raised by action of a cam element 280 on the roller 281. The link extension 268 which reaches into the orbit of the actuating roller 270 moves during all normal operations of the machine unitarily with the slide. The slide 265 and associated parts are yieldingly urged to their normal positions, shown in Figure 14, by a spring 275, such normal position being determined by a stop pin 277 on one of the bracket elements 262. For quiet return of the just described cycle-actuated parts, the rocking structure 257 has connected thereto a return impeding air dash-pot 291a, see Figure 14.

It is conceived to latch the roller 253 in the actuating range with the bar 246 as the cam element 280 rides onto, or over the roller 281. As may be understood from Figure 16, the front-feeding device may thus be conditioned for opening operation as or before the carriage reaches a position in which the cycle mechanism is to be activated for opening the front-feeding device. Namely, the roller 253 has a top rim 307 which as the roller is raised, engages and glides upwardly, transversely over a beveled edge 308, to latch or catch over the bar 246. In being lifted into operating range with the bar 246, the spring 291 allows momentary forward yield of the roller, and finally is instrumental to maintain the roller 253 coupled to the bar, for subsequently operating the latter rearwardly near the end of the machine cycle, as illustrated in Figure 17. At the end of each machine cycle in which said bar 246 is actuated, and providing there is then no cam element 280 operative on the roller 281, the normal position of the roller 253 and operating parts therefor, depicted in Figure 14, will become re-established.

Figure 15 illustrates the actuating mechanism for the bar 246 operated idly, the roller 281 having not been contacted by a cam 289, and the roller 253 consequently having received an idle rearward actuation in a path below the bar 246.

The cam elements 289 are constructed as best seen in Figures 5, 12 and 17, and comprise each, a main body 292 of sheet metal, having a vertical wall 293, a wide top flange 294, and two spaced bottom flanges 295. To the wall 293 there is riveted a cam-block 298 which has a bottom face 296 sloping downwardly and rearwardly, and has also side faces 297 beveled toward said bottom face, said vertical wall 293 conforming substantially with said faces 296, 297 at the rear of the cam block 298. The said flanges 294 and 295 have studs 300 reaching towards each other into longitudinal grooves 301 provided oppositely in the top and bottom sides of the bar 246. The control element 289 can be moved along the supporting bar 246 to any desired position and a thumb screw 303 can be tightened to press a spring leaf 302 into firm element-holding contact with the bar. The bar 246 has transverse grooves 304 near its opposite ends providing applying and exit clearances for the studs of the elements 289.

The requirement in different business systems varies as to when in the course of the preparation of records, front-fed sheets require removal from the machine, and/or as to when and under what conditions the machine should become conditioned for front-feeding sheets. The present machine is constructed to adapt it with simple adjustments for a virtually unlimited variation of requirements. Where it is desired to open the front-feeding device automatically substantially incident to the return of the carriage, a cam element 289 may be provided in the last active printing column, so that a machine cycle instituted in this last printing column will automatically open the front-feeding device, giving the operator the opportunity to remove one front-fed sheet and substitute another during the ensuing carriage return. Where work requires the opening of the front-feed throat in one or more intermediate positions of the carriage, the cam element 289 may be arranged to act on the roller 253 during advance travel of the carriage to the columnar position or positions in which the throat is desired to be opened incidental to the next cycle, it being understood that such cycle may be instituted automatically or manually.

The machine includes mechanism, not shown, for effecting return of the carriage optionally to any one of several columnar positions. If the nature of the work requires, the front-feeding devices may be conditioned automatically by a cam element 289 as a result of only such carriage returns which are beyond a certain columnar position. Where the nature of the work requires the carriage to be returned always to the same position, and where such work calls for throat-opening at the end of the return, the coupling action may occur at any time during the return movement of the carriage, and an automatic opening operation of the throat may then ensue as a result of a cycle instituted automatically as the carriage settles to the first columnar position.

The cam elements 289 are adapted to act upon the coupling mechanism while the carriage travels in either direction, for which reason in some machine set-ups the front-feed mechanism will open in consequence of carriage advance as well as carriage return movement. Obviously, the controls 280 may be constructed to by-pass in one or the other direction of carriage travel if this should be desirable.

The beveled side faces 297 and the bottom face 296 on the cam-block 298 are provided to make possible full closure of the front-feed throat in the event a cam-block should be moving forwardly while approaching a coupling position opposite to the roller 281.

10. *Automatic restoration of front-feed device*

It is an important feature of the invention to provide for automatic restoration of the front-feeding device fully independently of the control mechanism which conditions the front-feeding device for opening operation. In the embodiment of the invention shown, the front-feeding device is restored under the supplemental control of the carriage and the cycle-instituting means, the latter of which may be automatic and manual. It will be recalled that the front-feeding device is detained in open condition by a latch arm 216 on the right carriage end in cooperation with a shoulder 219. Said latch arm 216, see especially Figures 6 and 19, has a downwardly reaching branch 312 integral therewith, and constituting a part of a unitary bail-structure including at the left carriage end an arm 313 and including further a bail-bar 314 extending in a direction parallel to the carriage and being substantially co-extensive therewith. The arm 313 is pivoted to the left carriage end as at 315 so that the bail 314 is swingably displaceable rearwardly. The entire bail structure tends to assume the normal position seen in Figures 6 and 19, under the tension of a spring 216ᵃ, see Figure 20. Clips 318 are provided in desired positions along the bar to afford projecting faces 322 on the bar and thereby to render the bar operable under positional control of the carriage by an operating pin 321 on a horizontally disposed lever 320. Said lever is pivoted as at 323, see Figure 19, to the framework of the machine and is actuatable by another lever 324 which lies in a vertical plane, is pivoted to the framework as at 325, and is forcibly actuated at the beginning of each machine cycle by a stud 326 on the aforedescribed cycling disk 101. Said stud 326 wipes against a cam face 327 at the outset of each machine cycle but a rearward displacement of the bail bar 314 and a consequent liberation of the slide 196 for rearward movement by the spring 214, to effect restoration of the front-feeding device, will be in evidence only in those carriage positions in which a clip 318 is opposite the lever pin 321. In all other carriage positions the lever 320 will be operated idly, leaving the front-feed device open. The lever 320 is urged to its normal position by a spring 330 and normal position of both the levers 320 and 324 is established by a stop 331. Displacement of the lever 324 is early enough in the cycle so that the front-feed table 170 will get out of the way of the type-bars as the latter rise. A dwell continuation 328 of the cam 327 provides that the slide structure 196 will have ample time to start its restoring movement. The clips 318 are applied to lie opposite the operating pin 321 in all those carriage positions in which the type-bars would be liable to rise and clash with the front-feed table 170. In machines where the frontfeed table 170 need only be of short length a clip or clips 318 need to be provided only for the range of such short table.

In Figure 7 is shown a front-feed table 170 which only extends for a portion along the carriage, and the type-bars 10 are indicated as having risen to printing position at the left of the front-feed table, as for typing on the portion of the indicated record sheet R which extends leftwardly of the statement sheet S. The type-bars may also rise to the right of the indicated statement sheet while the front-feed table is in a forward position. So long as the front-feed table 170 is not in or is not advancing into the operating range of the type-bars 10, such table can be moved to, or can remain in front-feed position, facilitating removal and introduction of frontfed sheets without loss of time and while other operations are in progress. A short length frontfeed table such as shown in said Figure 7 may be used, for example, where the machine is outfitted to perform automatic multiplication in accordance with the U. S. patent to Atwater No. 2,308,259, of January 12, 1943. In the machine of this patent a succession of adding cycles occur in several columns, automatically under carriage control, to the end of effecting multiplication. The several columns in which the multiplication process is being carried out, are lateral of the front-feed table 170, and the latter may be moved and may remain forward in all those columnar positions where the multiplication process is taking place. Clips 318 being only provided over the range shown, a change of frontfed sheets can thus be effected while the multiplication process takes place, it being understood that a cam 289 may be provided for rendering the front-feed device open in any zone, except in the zone of the front-feed table.

Referring to Figure 20, the clips 318 are of channel-like form, comprising, a bottom wall 333 and a top wall 334, joined by a front wall affording said projecting face 322. The bottom wall 333 ends in a goose-neck spring finger 335 for engagement in a rear groove 317 of the bar 314. The clip is applied to the bar by setting the rear edge of its wall 334 into a front groove 317, and then thrusting the rear portion of the clip upwardly.

To satisfy various requirements, clips of different lengths are supplied for attachment, either alone or in combinations.

From the foregoing it will be seen that the front-feed device can be caused to open automatically, and also can be caused to close automatically, in whatever carriage positions such operation may be desirable in accordance with the particular requirements of each installation. Always the front-feed device opens during the last part of the cycle, and closure always occurs at the very beginning of the cycle before the typebars rise.

11. *Normalizer key, and heading balances*

The machine, see Figure 9, includes a normalizer key 382 and mechanism controlled thereby, substantially as disclosed in said U. S. patent to Sundstrand No. 2,194,270. This normalizer key, when depressed, is effective to incapacitate the mechanism whereby in response to each machine cycle there ensues a tabulating step of the carriage from one columnar dog 107 to another. The normalizer key is mounted for vertical operation by frame-supported pins 383 which reach into slots 384 of the key, one of the slots being widened at the top to form a key-locking shoulder 385 for catching underneath one pin 383 under the tension of a key-restoring spring 386. The key 382 is operative on a lever 387 which by means, only diagrammatically shown, but fully described in said Sundstrand patent, operates upon a transversely disposed lever 388 to swing the left lever-end rearwardly. Whenever this takes place the rearwardly swinging end of the lever 388 operates on the lever 126 of the cycle-operated tabulating mechanism to swing its left end rearwardly out of range of the cyclically operated vertical slide 125. Thus the cycling mechanism is then unable to induce a tabulating motion of the carriage. The normalizer key is releasable by giving it a slight rearward thrust.

It is the practice in many business establishments to forward the balances of a group of accounts to new sheets from time to time successively, sheet after sheet and without intermediate postings. Since such forwarding balances are always to be entered in the same column, it is advantageous to have the carriage localized while doing such work. Obviously the normalizer key aforedescribed can be utilized to do this conveniently and expeditiously, it being merely required that a dog 107 be set in the required columnar position, and to station the carriage under control of this dog, and that the normalizer key 382 be set to locked position.

Inasmuch as for such work the introduction of the work-sheet requires opening of the front-feed device, and inasmuch as after each posting of the forwarding balance the sheet requires removal, the operator sets a throat opening clip 318 and a throat closing control element 280 respectively opposite the pin 321 and the roller 281.

The machine having been so conditioned it will be evident that upon each successive cycling operation instituted by a depression of the cycle key 5, the front-feed throat will always open near the end of the cycle when the roller 279 on the cycling disk 191 wipes past the spring-leaf-faced flange 274, and that the throat will always close when the stud 326 wipes along the cam face 327 at the beginning of the cycle and before the typebars rise to printing position.

Referring to Figure 17 it should be noted that at the end of each cycle the rimmed actuating roll 253 for the throat opening control bar 247 drops and restores to forward position but that the bar 247 is held in rearward position under control of the open throat latch 216, 218, seen in Figure 10. Thereafter when the throat is automatically closed at the beginning of the cycle, the bar 246 restores forwardly and the cam face 296 on the underside of the cam block 298, see Figure 18, will reclutch the rimmed roller 253 to the bar to subsequently operate it again towards the end of the machine cycle.

In forwarding a balance to each sheet, the operator merely inserts the sheet down the open front-feed throat, indexes the balance amount to be forwarded, operates the cycle key, and then removes the sheet, the front-feed device automatically closing and opening respectively at the beginning and end of each cycle without the least attention by the operator.

12. *Miscellaneous and conclusion*

For locating the rear-fed sheets R at the desired writing line, the bottom-edge of the front-feed table 170 may be used as a line finder.

The front-fed sheets may be positioned at their desired writing lines by the aid of any known devices or methods which may be suitable for the particular work to be done. Some such devices and methods have been described in the aforesaid application of which this is a division. For example, if a work-sheet S is to receive one or more line-entries from time to time underneath a previous line-entry, such sheet may be positioned by matching the last previous line-entry with the lower edge of the front-feed table 170.

While the form of mechanisms herein shown and described is admirably adapted to fulfill the objects stated, it is to be understood that it is not intended to confine the invention to the forms or embodiments herein described, for the invention is susceptible of embodiment in various forms, all coming within the scope of the claims which follow.

What is claimed is:

1. In a business machine having a carriage movable to different positions on a frame, and having an openable and closeable front-feed device on the carriage; means to open and close said front-feed device, comprising two members, one operable for closing said front-feed device and one operable for opening it, two other members, one for each of said first two members, associated therewith and movable transversely of the direction of the movement of the carriage, the two members of each of said associations being relatively oppositely supported on the frame and on the carriage, and the carriage-supported members being operable by the frame-supported members, and frame-supported means to operate the frame-supported members.

2. The machine set forth in claim 1, including machine cycling means, said frame-supported operating means including parts of the machine cycling means to power-operate that frame-supported member which is associated with a carriage supported member for opening the front-feed device.

3. The machine set forth in claim 1, one of the two members in the association which includes the member that is operable for closing the front-feed device, being elongate in the direction of carriage travel, and the machine including means to render the carriage-supported member of the last-mentioned association operable only subject to carriage control.

4. In a business machine, the combination with a printing platen and a supporting frame therefor, of feed-roll means comprising axially spaced feeding sections normally applied against the front-bottom side of the platen, sheet deflector means accommodated between at least some of the said feeding sections and closely to the platen while said feeding sections are applied against the platen, means to move said sheet deflector means away from the platen so that there is a wide open throat therebetween and the platen, and in association therewith to release said feed-roll means to an extent so that the roll-sections thereof become withdrawn below the deflecting surfaces of the deflector means, and paper-guiding means fast on the platen-supporting frame and constituting a sheet-guiding continuation of the moved-away deflector means to the rear thereof.

5. In a business machine, the combination with a platen and a supporting frame therefor, of a first, a second and a third feed-roll means normally bearing against said platen respectively along the front-bottom side, the rear-bottom side, and the top side, said first feed-roll means comprising axially spaced feed-roll sections, a front-feed table, having a lower edge normally disposed above and slightly to the rear of a typing line on the front of the platen, and rising upwardly from said edge, apparatus to move said first feed-roll means away from the platen and in association therewith also to displace said front-feed table forwardly of the platen to a forwardly tilted position, means for guiding work-sheets presented down the rear of the forwardly tilted front-feed table, over the released first feed-roll means, in a wide sweep around the underside of the platen and rearwardly below the said second feed-roll means, said guiding means including, a major portion fixedly carried on said frame, and a series of deflector elements normally nested closely to the platen between at least some of the feeding sections of the first feed-roll means, and said apparatus including means effective to move also said deflector elements from the platen, and to such an extent that front-fed work-sheets are guided clear over the first feed-roll means, and means to release said second and third feed-roll means, said latter two feed-roll means being provided for feeding and holding rear-inserted work-sheets around the bottom and front of the platen.

6. In a business machine having a revolvable platen, work-sheet holding means normally bearing against the front-bottom side of the platen, a front-feed paper table having a lower edge normally disposed closely to the platen, above and slightly to the rear of a typing line on the front of the platen, thereby to hold a work-sheet against the typing line, said table normally rising upwardly from the said edge, means mounting said work-sheet holding means for release from the platen to form an open front-feed throat, and means mounting said table for pivotal displacement, forwardly about an axis parallel to the platen and to the rear of and below the platen axis, to a position wherein the work-sheets can be introduced down the rear of the front-feed table in substantially straight condition downwardly and rearwardly past the front-side of the platen, into the open front-feed throat.

7. In a business machine having a frame and having a carriage movable across said frame to different positions; a releasable paper-holding device on said carriage, power-actuating means on said frame, means to transmit a releasing motion from said power-actuating means to said device and comprising, coupling means capable of effective and ineffective conditioning, and a bar and an element, oppositely on the frame and the carriage, one capable of operation by the other in any position of the carriage, and means including means on said bar to exercise, by reason of changes in carriage position, such control over the condition of said coupling means that action of the motion transmitting means on said paper-holding device is subject to carriage control.

8. In a business machine having a frame and having a carriage movable across said frame to different positions, releasable paper-holding means on the carriage, a bar on the carriage extending in the direction of carriage movement and actuatable transversely to said direction to release said paper-holding means, power-means on the frame to actuate said bar, said power-means including, coupling means capable of effective and ineffective conditioning, and means including means adjustably positionable along said bar to exercise by reason of changes in carriage position such control over the condition of said coupling means that actuation of said bar by said power-means is subject to carriage control.

9. In a business machine having a frame and having a carriage adapted to traverse said frame, releasable paper-holding means on said carriage, a bar extending parallel to the traverse of the carriage and being mounted on the latter for actuation transversely of said traverse, means to release said paper-holding means as a result of the actuation of said bar, a part on said frame movable into and out of cooperative association with said bar, and operable when associated therewith to actuate said bar, means including control means on said bar, to move said part into and out of cooperative association with said bar by reason of positional changes of the carriage, and power-means to operate said part.

10. In a calculating machine having means for giving it cycles of operation, a frame, a carriage adapted to traverse said frame, front-feed means on said carriage, movable from a printing to an open-throat position to facilitate work-sheet insertion, printing devices adapted to make printing impressions on the work-sheets during machine cycles before a certain point in the cycle is reached, actuatable means, conditionable to render it capable of moving said front-feed device to open-throat position, and including a bar and an element oppositely on the frame and the carriage, one capable of operation by the other in any position of the carriage whenever said actuatable means is conditioned, means including control-means on said bar to condition said actuatable means under carriage control, and means automatically effective after said point in the cycle has been passed, to power-actuate said actuatable means.

11. In a business machine having a frame-member, and having a carriage-member movable to different positions on the frame-member, printing instrumentalities, cycling means causing said printing instrumentalities to print at a printing phase in the cycle, a front-feed device movable from a closed-throat to an open-throat position and vice-versa, and means to move said device oppositely to the said positions, comprising, means adapted to respond to the cycling means ahead of the latter reaching printing phase, to move said front-feed device from open-throat to closed-throat position, and means controlled by reason of positional changes of the carriage-member on the frame-member to render said responsive means either responsive or unresponsive to said cycling means.

12. In a business machine having a frame-member, and having a carriage-member adapted to be moved to different positions on the frame-member; a releasable paper-holding device on one of said members, and means to release and means to restore said paper-holding device, each of said means comprising independent control devices, oppositely on said members, to predetermine for each of said means any position of the carriage-member in which either means may be rendered active.

13. In a business machine having power-cycling means for causing the machine to execute certain functions, and having a frame, and a carriage adapted to traverse said frame; paper-holding means on the carriage, and means to release and to restore said paper-holding means, comprising, means forcibly operable by action of the power-cycling means during an early phase of the cycle to cause restoration of the paper-holding means during such early phase of the cycle, and means to cause the release of said paper-holding means forcibly by action of the same power-cycling means during a later part of the cycle.

14. In a business machine, the combination with a platen, of typing means operable to rise above a typing line at the front of the platen, work-sheet holding means bearing normally against the bottom of the platen, means mounting said platen and work-sheet holding means for relative movement to provide an openable and closeable front-feed throat for receiving and holding work-sheets, front-feed guiding means, normally clear of the operating range of the typing means, but displaceable thereinto to facilitate introduction of work-sheets into the opened front-feed throat, and apparatus to move said platen and work-sheet holding means relatively to open and to close said throat and respectively in association therewith to displace and to restore said front-feed guiding means in differently timed relation, said apparatus comprising means timing said front-feed guiding means to move into obstructing relation with the typing means only after the front-feed throat has begun to open, and comprising also means to cause the relative throat-closing movement of the platen and work-sheet holding means to be concluded ahead of the restoring movement of the front-feed guiding means.

15. The combination in a business machine having machine cycling means, and typing means operable by the cycling means before a late phase of the cycle, of a front-feed table mounted for displacement from an out-of-way position with respect to said typing means to a front-feed position in which it is in conflicting range with the typing means, and control mechanism for said table, including, means adapted to respond to the cycling means during said late cycle-phase to displace said front-feed table to said front-feed position, and including means to prevent movement of the table into conflicting range of the typing means by manual force applied to the table.

16. In a business machine, the combination with a printing platen, of a series of feed-rolls normally bearing against the underside of the platen and having each a circumferentially reduced intermediate section, fore-and-aft extending sheet deflector elements individual to said rolls and normally nested closely to the platen in the clearances provided by the reduced feed-roll sections, means supporting said feed-rolls for individual release from the platen, means to release at least some of the feed-rolls collectively to provide a wide front-feed clearance therebetween and the platen, and means to connect operatively each individual feed-roll with its associated deflector element, comprising means for each feed-roll in its releasing movement to impart to its associated deflector element a movement away from the platen and of such an extent that the moved deflector elements are capable of guiding a work-sheet clear over their associated feed-rolls.

17. In a business machine, the combination with a printing platen and a supporting frame therefor, of feed-roll means comprising axially spaced feeding sections normally applied against the platen, sheet deflector elements accommodated between at least some of the feeding sections and positioned closely to the platen while said feeding sections are applied against the platen, a bar extending longitudinally of the platen on said frame, slide means supporting and guiding said deflector elements on said bar for movement from and to the platen, and means to cast said feed-roll means from the platen and incidentally thereto to move also said deflector elements from the platen but to a less degree.

18. In a business machine having a frame and having a carriage movable across said frame to different positions; a releasable paper-holding device on said carriage, power-actuating means on said frame, means to transmit a releasing motion from said power-actuating means to said device and comprising, coupling means capable of effective and ineffective conditioning, and a bar and an element, oppositely on the frame and the carriage, one capable of operation by the other in any position of the carriage, and means including cam-means adjustably positionable along said bar to exercise, by reason of changes in carriage position, such control over the condition of said coupling means that action of the motion transmitting means on said paper-holding device is subject to carriage control.

19. In a business machine having a frame and having a carriage movable across said frame to different positions; a releasable paper-holding device on said carriage, normally idle machine cycling means on said frame, cycle-instituting means, means actuatable by said cycling means to release said device and comprising, coupling means capable of effective and ineffective conditioning, and a bar and an element oppositely on the frame and said carriage, one capable of operation by the other in any position of the carriage, and means including means on said bar to exercise such control over the condition of said coupling means that action of the cycling means on said paper-holding device during each machine cycle is subject to carriage control.

20. In a business machine having a frame and having a carriage adapted to traverse said frame, releasable paper-holding means on the carriage, a bar extending parallel to the traverse of the carriage and being mounted on the latter for actuation transversely of said traverse, means to release said paper-holding means through actuation of said bar, a frame-supported operating part for said bar, normally operatively disassociated from the latter, means to associate operatively said part and said bar under carriage control, said part, when operatively associated with said bar being operable to actuate the latter, said associating means comprising, control means carried on and movable with said bar, and means on the frame, controlled by said control means by reason of positional changes of the carriage, to provide for operative association of said part and said bar in a certain position of the carriage exclusive of other carriage positions, and power means to operate said part.

21. In a business machine having a frame and having a carriage movable across said frame to different positions, a releasable paper-holding device on said carriage, power-actuating means on said frame, means to transmit a releasing motion from said power-actuating means to said device, said transmitting means including, a bar and an element oppositely on the frame and the carriage, one capable of operation by the other in any position of the carriage, and normally open coupling means movable to closed position, means including cam-means on said bar to move said coupling means to a closed position by carriage movement through a certain zone, and means to retain said coupling means in closed position pending actuation of said motion transmitting means by said power-actuating means, and independently of whether the carriage passes out of said zone.

22. In a business machine having a frame and having a carriage movable across said frame to different positions, a releasable paper-holding device on said carriage, power-actuating means on the frame, means to transmit a releasing motion from said power-actuating means to said device, said transmitting means including a bar-element and a related element oppositely on the frame and the carriage, one movable into cooperative association with the other in any position of the carriage for operation of one element by the other, means including cam-means on said bar-element to move said one element into cooperative association with the other by passage of the carriage in either direction through a certain zone, and means to retain said two elements in cooperative association until said device has been actuated by said power-actuating means, said retaining means remaining active independently of the cam-means.

23. In a business machine having a frame and having a carriage adapted to traverse said frame, paper-holding means on said carriage, a bar on said carriage extending parallel to the traverse of the carriage and being mounted on the latter for actuation transversely on said traverse, frame-supported actuating means for said bar, and carriage controlled means for causing said bar and actuating means to be moved relatively into and out of cooperative association, said actuating means including, a roller for operating contact with said bar, having a rim for catching onto an edge of said bar as said actuating means is moved into cooperative association with said bar, said rim, when caught on said bar-edge, being instrumental to maintain said bar and actuating means in cooperative association until actuation of said bar has been effected by said actuating means.

24. In a business machine having a frame and having a carriage adapted to traverse said frame, paper-holding means on the carriage movable to a released position, a bar on the carriage extending parallel to the carriage and actuatable transversely thereto to release said paper-holding means, means for restorably detaining said paper-holding means and said bar upon actuation of said bar, a frame-supported actuating mechanism for said bar, including a reciprocatory actuator which is movable into and out of actuating range with said bar and biased to move out of such range, means including a cam-unit on said bar, operative as the carriage travels through a certain zone to move said actuator into actuating range with said bar, means cooperative with said bar to latch said actuator in said range pending the return reciprocation of the actuator, said cam-unit after actuation of said bar leaving said biased actuator at the beginning of the return reciprocation free to move automatically out of actuating range with said bar, and means including a cam-face on said cam-unit, capable in a specific position of the carriage, upon restoration of said bar, of moving said actuator into actuating range with said bar.

25. In a business machine having a carriage-member movable to different positions on a frame-member, releasable paper-holding means on one of said members, and means to release and to restore said paper-holding means, comprising, manually operable part, and means to effect restoration of said paper-holding means under supplemental control of the carriage-member and said manually operable part.

26. In a business machine having a carriage-member movable to different positions on a frame-member, releasable paper-holding means on one of said members, and means to release and to restore said paper-holding means, comprising, a machine cycling key, and means to effect restoration of said paper-holding means under supplemental control of the carriage-member and said cycling key.

27. In a business machine having a carriage-member movable on a frame-member, operable recording facilities, a paper-table on one of said members, and means to move said table into and out of operation-obstructing position with said recording facilities, comprising an operable part, and means to move said table out of obstructing position under supplemental control of the carriage-member and said part.

28. In a business machine having a carriage-member movable on a frame-member, a machine cycling key and recording facilities operated responsive to said key; a paper-table, and means to move said table into and out of operation-obstructing relation with said recording facilities, including means responsive to said key under carriage-member control, to move said table out of operation-obstructing relation with the recording facilities.

29. In a business machine, a normally quiescent power-cycling means, cycle instituting means, a frame-member, a carriage-member movable on said frame-member, releasable paper-holding means on one of said members, and means to release and to restore said paper-holding means, comprising, a mechanism, constructed and conditionable for actuation by said power-cycling means to cause restoration of said paper-holding means early during a machine cycle, and means to condition said mechanism under carriage-member control.

30. In a business machine having a frame and having a carriage adapted to traverse said frame, paper-holding means on said carriage movable from a closed-throat to an open-throat position and vice-versa, key-means, and means to cause restoration of said paper-holding means to closed-throat position, under carriage control in response to operation of said key-means, said causing means including a bar extending parallel to the traverse of the carriage and control means on said bar.

31. In a business machine having a frame and having a carriage adapted to traverse said frame, paper-holding means on said carriage movable from a closed-throat to an open-throat position and vice-versa, key-means, and means to cause restoration of said paper-holding means to closed-throat position, under carriage control in response to operation of said key-means, said causing means including a bar extending parallel to the traverse of the carriage and control means adjustably positionable along said bar.

32. In a business machine having a power-cycling means adapted to be given cycles of operation for causing the machine to execute certain functions, a frame, a carriage adapted to be moved to different columnar positions on the frame, paper-holding means carried on the carriage and operable thereon from effective to ineffective position, and restorable vice-versa, cycle-instituting means, and means to cause restoration of said paper-holding means under supplemental control exercised by the carriage and the cycle-instituting means in a manner so that said paper-holding means will be restored in response to operation of the cycle-instituting means if the carriage has been moved to a certain columnar position, but not if it has been moved to certain other columnar positions, said causing means including a bar, and means adjustably positionable along said bar for said carriage to exercise its supplemental control in the required manner.

33. In a business machine having a power-cycling means adapted to be given cycles of operation for causing the machine to execute certain functions, a frame, a carriage adapted to be moved to different columnar positions on the frame, paper-holding means carried on the carriage, operable thereon from effective to ineffective position, and restorable vice-versa, cycle-tripping means, and means to cause restoration of said paper-holding means, comprising, a bar extending parallel to the carriage and supported on the latter for operation transversely of the direction of the carriage movement in order to cause restoration of the paper-holding means, and means including control means on said bar to cause said bar to be operated in response to the operation of said cycle-tripping means if the carriage has been moved to a certain columnar position, but not if the carriage has been moved to certain other columnar positions.

34. In a business machine having a carriage-member movable to different positions on a frame-member, releasable paper-holding means on one of said members, an operable part on one of said members, and means to release and to restore said paper-holding means, comprising means under supplemental control of said part and the carriage-member to cause the restoration of said paper-holding means if said part is operated after movement of the carriage-member to a certain position, but not if said part is operated after movement of the carriage-member to certain other positions, said causing means comprising means oppositely on said members cooperative to predetermine the position of the carriage-member in which operation of said part may cause restoration of said holding means.

35. In a business machine, a normally quiescent power-cycling means, cycle instituting means, a frame-member, a carriage-member movable on said frame-member, releasable paper-holding means on one of said members, and means to release and to restore said paper-holding means, comprising, means constructed and conditionable for actuation by the power-cycling means to cause release of said paper-holding means late during a machine cycle, means constructed and conditionable for actuation of the power-cycling means to cause restoration of said paper-holding means early during a machine cycle, and means to condition each of said conditionable means individually under carriage-member control.

36. In a business machine having a carriage-member movable to different positions on a frame-member, paper-holding means on one of said members movable from applied to released position, and biased from one towards the other position, means to detain said paper-holding means automatically in said one position upon movement thereto, an operable part, and means to release said detaining means under control of said carriage-member in response to operation of said part.

37. In a business machine having a carriage-member movable to different positions on a frame-member, paper-holding means on one of said members movable from applied to released position, and biased from one towards the other position, means to detain said paper-holding means automatically in said one position upon movement thereto, an operable part, and means, including control means oppositely on said members, to release said detaining means under control of said carriage-member in response to operation of said part.

38. In a business machine having a frame-member, and having a carriage-member movable to different positions on said frame-member, paper-holding means on one of said members movable from an applied to a released position, and biased from one towards the other position, means to detain said paper-holding means automatically in said one position, and means to release said detaining means, comprising, means operable on one of said members, and means on the other member, operable by the operable means subject to carriage-member-control.

39. In a business machine having a carriage-member movable to different positions on a frame-member, paper-holding means on one of said members movable from applied to released position, and biased from one towards the other position, means to detain said paper holding means automatically in said one position upon movement thereto, and means to release said detaining means under control of said carriage-member, comprising, a bar-element on one of said members extending in the direction of carriage movement, another element on the other member, and control means on said bar to render one of said elements operable by the other under carriage-member-control.

40. In a business machine having a frame and having a carriage adapted to move on said frame to different positions, paper-holding means on said carriage movable from a closed-throat to an open-throat position, means urging said paper-holding means to assume closed-throat position, means to detain said paper-holding means in open-throat position upon movement thereto, power-means to move said paper-holding means to open-throat position and to leave the paper-holding means thereupon free to restore, key-means on the frame, and means adapted to respond to operation of said key-means only if the carriage has been moved to a specific position exclusive of other positions, to release said detaining means, thereby to cause restoration of the paper-holding means to closed-throat position by said urging means.

41. In a machine, two relatively movable means to provide an operable and closeable front-feed throat for releasing and holding work-sheets, front-feed guiding means displaceable from an out-of-way position to a position facilitating front-feeding of work-sheets into the open-throat, and apparatus relatively to move said two movable means either to open or to close said throat, and respectively in association with such relative movements to displace and to restore said front-feed guiding means in differently timed relation, said apparatus comprising means timing said relative throat-opening movement to occur not later than concomitantly with the displacement of the front-feed guiding means, and timing the relative throat-closing movement to occur in advance of the restoring movement of the front-feed guiding means.

42. In a business machine the combination with a platen, feed-roll means normally bearing against the platen, means mounting said platen and feed-roll means for relative movement to provide an openable and closeable front-feed throat, for releasing and holding work-sheets, front-feed guiding means displaceable from an out-of-way position to a position facilitating front-feeding of work-sheets into the open front-feed throat, and apparatus, to move said platen and feed-roll means relatively, to open and to close said throat, and in association therewith respectively to displace and to restore said front-feed guiding means in differently timed relation, said apparatus comprising means timing the relative throat-opening movement between the feed-roll means and the platen to occur not later than concomitantly with the displacement of the front-feed guiding means, and timing the relative throat-closing between the feed-roll means and the platen to occur in advance of the restoring movement of the front-feed guiding means.

43. In a business machine the combination with a platen, work-sheet holding means normally bearing against the platen, means mounting said platen and holding means for relative movement to provide an openable and closeable front-feed throat, for releasing and holding work-sheets, front-feed guiding means displaceable from an out-of-way position to a position facilitating front-feeding of work-sheets into the open front-feed throat, an operable and restorable member, control means conversely to cause operation and to cause restoration of said member, and means responsive to operation of said member to effect a relative throat-opening movement of the holding means and the platen, and a displacement of the front-feed guiding means, so timed, that the throat opens not later than concomitantly with the displacement of the front-feed guiding means, said responsive means being further responsive to the restoration of said member to effect first a relative throat-closing movement between the holding means and the platen, and delayedly to effect a restoration of the front-feed guiding means.

44. In a business machine, an openable and closeable front-feed throat, comprised of a platen and means movable relatively thereto, work-sheet guiding means displaceable from an out-of-way position to one facilitating front-feeding of work-sheets into the opened front-feed throat, means to open and close said throat, means to displace said guiding means to front-feeding position incidental to the opening operation of said throat, said displacing means freeing said guiding means for restoration incidental to throat closing operation, resilient means to urge restoration of said guiding means, and means controlled by the throat-opening and closing means to suppress restoration of the sheet-guiding means until each throat closing operation approaches conclusion.

45. In a business machine, an openable and closeable front-feed-throat, comprised of a platen and means movable relatively thereto, work-sheet guiding means displaceable from an out-of-way position to one facilitating front-feeding of work-sheets into the open front-feed throat, means to open and close said throat, means to displace said guiding means to front-feeding position incidental to the opening operation of said throat, said displacing means freeing said guiding means for restoration incidental to throat closing operation, resilient means to urge restoration of said guiding means, and means controlled by the throat-opening and closing means to suppress restoration of the sheet-guiding means until each throat closing operation approaches conclusion, and a device to control the speed at which the resilient means can urge restoration of the guiding means.

46. In a business machine, the combination with a platen, of typing means adapted to make impressions along a typing line along the front of the platen, work-sheet holding means normally bearing on said platen below said typing line, means mounting said holding means for release from the platen to provide a front-feed throat for receiving and holding a work-sheet, front-feed guiding means normally disposed to bear against a work-sheet above said typing line, thereby to hold such sheet at the typing line against the platen, said front-feed guiding means being displaceable forwardly to facilitate front-feeding of a work-sheet into the open front-feed throat, and apparatus for control of said holding means and said front-feed guiding means, comprising, means to effect at least a partial release of the holding means from the platen without effecting a displacement of the said front-feed guiding means which will permit the work-sheet to flex from the platen at the typing line, and means to release said holding means fully and conversely to cast it on, and respectively in association with such converse action to displace and to restore said front-feed guiding means, said apparatus comprising a timing provision to make the restoration of the front-feed guiding means lag behind the casting-on action of the holding means.

47. The combination in a business machine having machine cycling means, and typing means operable by the cycling means before a late phase of the cycle, of a front-feed table mounted for displacement from an out-of-way position of said typing means to a front-feed position in which it is in conflicting range of the typing means, said table having capacity for a partial displacement without getting into conflicting range of the typing means, and being normally capable of such displacement by manual force applied directly thereto, and a control mechanism for said table, including, means adapted to respond to the cycling means during said late cycle phase to displace said front-feed table to said front-feed position and including also means operative when said table is displaced by manual force applied directly thereto to restrict such displacement to an extent short of bringing the table into conflicting range of the typing means.

48. The combination in a business machine having machine cycling means, and typing means operable by the cycling means before a late phase of the cycle; of a front-feed table mounted for displacement from an out-of-way position of said typing means to a front-feed position in which it is in conflicting range of the typing means, said table having capacity for a partial displacement without getting into conflicting range of the typing means, and a control mechanism for said table, including, means adapted to respond to the cycling means during said late cycle-phase to displace said front-feed table to said front-feed position, means to effect a partial displacement of said table short of bringing it into conflicting range of the typing means, and including also means operative when said table is displaced by manual force applied directly thereto to restrict such displacement to an extent short of bringing the table into conflicting range of the typing means.

49. In a business machine, the combination with an openable and closeable front-feed throat, of a front-feed table for presenting work-sheets down said throat, mounted for opposite movement between a typing position and a front-feed position, and a control mechanism for said table, including, means for blocking said table against movement from either one to the other of said positions by manual force applied directly to the table, manipulative means, and means controllable by said manipulative means in each of said positions of the table to render said blocking means released and to cause a movement of the table to the other position.

50. The combination in a business machine having a normally quiescent machine cycling means and means to institute machine cycles, of a frame, a carriage movable on the frame, an openable and closeable front-feed throat on the carriage, a front-feed table on said carriage for presenting work-sheets into said throat, said table mounted for opposite movement between a typing and a front-feed position, and a control mechanism for said table, including, means effective upon arrival of said table in either of said positions to block said table against movement from either one to the other of said positions by manual force applied directly on the table, and means to oppositely move said table, comprising means responsive to the institution of machine cycles to condition said blocking means for movement of said table from said front-feed to said typing position, and further responsive to certain machine cycles, late in such cycles, to condition said blocking means for movement of said table from typing to front-feed position.

51. The combination in a business machine, of typing means operable to rise above a typing line, a normally closed front-feed throat, a table mouted for displacement from an out-of-way position of the typing means to a front-feed position in which it is in obstructing range of the typing means, said table having capacity for a partial displacement without getting into obstructing range with said typing means, means to displace said table to said front-feed position and concomitantly to open said front-feed throat, said table being capable of partial displacement by force applied directly thereto and when given such partial displacement being effective at least to open partially said front-feed throat, and means to restrict displacement of said table to said partial extent when displaced by manual force applied thereto but to permit full displacement thereof to front-feed position under control of said displacing means.

52. In a business machine having a machine cycling means, machine cycle instituting means, a carriage movable to different positions on a frame, and having an openable and closeable front-feed device on the carriage; means to open and close said front-feed device, comprising two members, one operable for closing said front-feed device and one operable for opening it, two other members, one for each of said first two members, associated therewith and movable transversely of the direction of the movement of the carriage, the two members of each of said associations being oppositely supported on the frame and on the carriage, and the carriage-supported members being operable by the frame-supported members, means acting to operate one frame-supported member substantially immediately upon operation of said cycle instituting means, and means to operate the other frame-supported member by the cycling means substantially at the end of the cycle.

53. In a business machine having a carriage-member movable to different positions on a frame-member, releasable paper-holding means on one of said members, and means to release and to restore said paper-holding means, comprising, a manually operable control, and means adapted to effect restoration of said paper-holding means in response to an operation of said manual control, said effecting means including control means oppositely on the carriage-member and said frame-member and cooperative to restrict restoration of said paper-holding means to certain positions reached by the carriage.

54. In a business machine having a carriage movable to different positions on a frame, and having a releasable paper-holding means on the carriage, means to restore said paper-holding means, comprising, a bar member extending in the direction of movement of the carriage, another member that is narrow in the direction of movement of the carriage, said members being mounted one for movement with the carriage and the other on the frame, each for movement transversely of the direction of movement of the carriage, and elements adjustably locatable on said bar member to afford projections thereon to control the restoration of the paper-holding means, said members arranged in a relationship transversely of the carriage so that one is operatable by the other only in such positions of the carriage where one of said control elements assumes a position opposite said narrow member.

55. In a business machine having a carriage-member movable to different positions on a frame-member, paper-holding means on one of said members movable from applied to released position, and biased from one toward the other position, means to detain said paper-holding means automatically in said one position upon movement thereto, and means to release said detaining means, including control means carried oppositely on said carriage and frame-members cooperative to provide for possible release of said detaining means in certain positions of the carriage member exclusive of other positions thereof.

56. In a business machine having a carriage movable to different positions on a frame, front-feed means movable from a typing to a sheet-receiving position, and vice versa, motor-operable means conditionable for effective operation to move said front-feed means from sheet-receiving to typing position, a key, and means to condition said motor-operable means for effective operation under supplemental control of said key and said carriage.

WALTER A. ANDERSON.

REFERENCES CITED

The following references are of record in the file of this patent:

UNITED STATES PATENTS

| Number | Name | Date |
|---|---|---|
| 2,121,853 | Bower | June 28, 1938 |
| 2,138,482 | Davidson | Nov. 29, 1938 |
| 2,202,595 | Muller | May 28, 1940 |
| 2,202,596 | Muller | May 28, 1940 |
| 2,288,916 | Muller | July 7, 1942 |
| 2,441,870 | Christian | May 18, 1948 |
| 2,442,402 | Davidson et al. | June 1, 1948 |

Certificate of Correction

Patent No. 2,536,525 January 2, 1951

WALTER A. ANDERSON

It is hereby certified that error appears in the printed specification of the above numbered patent requiring correction as follows:

Column 23, line 1, before the word "manually" insert *a*; column 25, line 59, for "operable" read *openable*;

and that the said Letters Patent should be read as corrected above, so that the same may conform to the record of the case in the Patent Office.

Signed and sealed this 20th day of February, A. D. 1951.

[SEAL]

THOMAS F. MURPHY,
*Assistant Commissioner of Patents.*